Nov. 23, 1954 R. E. VAN WAGNER Re. 23,900
MOWER
Original Filed Jan. 30, 1946 2 Sheets-Sheet 1
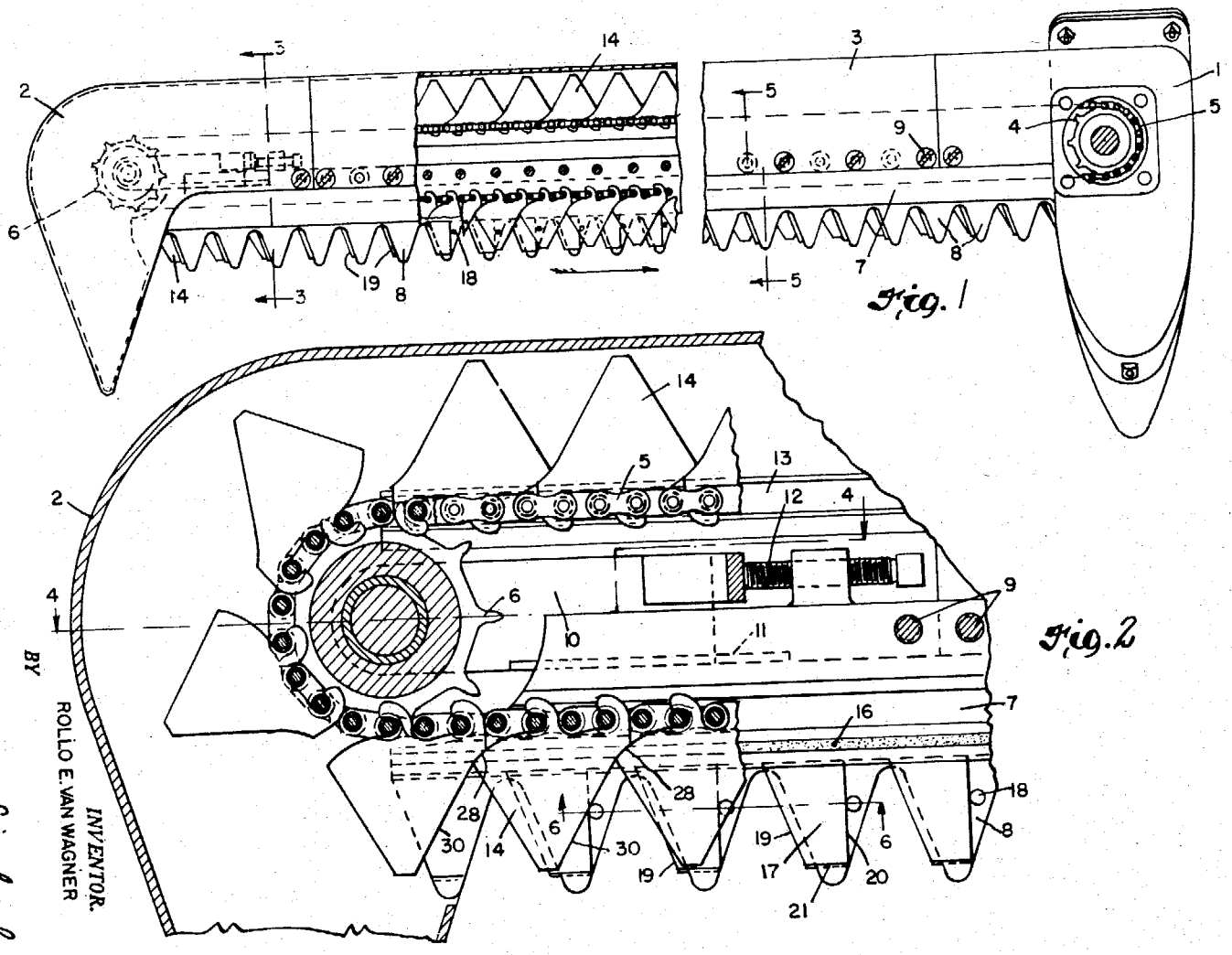
INVENTOR.
ROLLO E. VAN WAGNER
BY
Oberlin & Limbach
ATTORNEYS Nov. 23, 1954 R. E. VAN WAGNER Re. 23,900

MOWER

Original Filed Jan. 30, 1946 2 Sheets-Sheet 2

INVENTOR.
ROLLO E. VAN WAGNER

BY
Oberlin & Limbach
ATTORNEYS

United States Patent Office

Re. 23,900
Reissued Nov. 23, 1954

23,900

MOWER

Rollo E. Van Wagner, New Haven, Ohio, assignor to The Fate-Root-Heath Company, Plymouth, Ohio, a corporation Original No. 2,589,751, dated March 18, 1952, Serial No. 644,314, January 30, 1946. Application for reissue March 15, 1954, Serial No. 416,452

13 Claims. (Cl. 30—196)

Matter enclosed in heavy brackets [ ] appears in the original patent but forms no part of this reissue specification; matter printed in italics indicates the additions made by reissue.

This invention relates to mowing devices and more particularly to improvements in the cutting elements thereof and to the manner in which they are detachably connected to the device. It is an object of this invention to provide a novel means of detachably connecting a knife to a chain.

Another object is to provide novel cutting elements which can be simply stamped from sheet metal without requiring subsequent operations to provide the cutting edges. In other words, the cutting edges are disposed in a plane transverse to the direction of movement of the cutting elements.

Another object is to provide novel sealing means for excluding dirt and other foreign matter from the internal working mechanism of the device.

Another object is to provide a novel knife construction which can be readily detached from a chain at will but which is rendered indetachable during normal operation of the device.

Another object is to provide a novel knife and chain connection which makes provision for movement of the chain links out of alignment as when the chain passes over a sprocket wheel.

Another object is to provide readily placeable plates which cooperate with a knife to effect shearing as the knife moves relative thereto.

Another object is to provide a device in which there are a multiplicity of cutting edges arranged so that only some of them are operable at any particular instant. In this way, the strain or stress on the chain is reduced and rendered substantially uniform during the entire cycle of operation of the device.

Another object is to provide a device in which the knives move only in one direction and are carried by an endless chain.

Additional objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative however, of but a few of the various ways in which the principle of the invention may be employed.

In the drawing:

Fig. 1 is a plan view of the entire device with a portion of the cover plate removed;

Fig. 2 is a cross sectional view of one end of the device;

Figure 5:
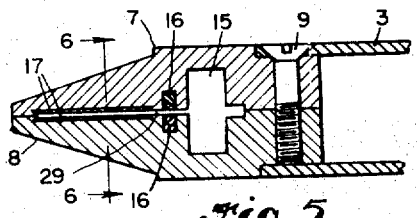
Fig. 5 is a cross sectional view taken along line 5—5 of Fig. 1.
Figure 6:
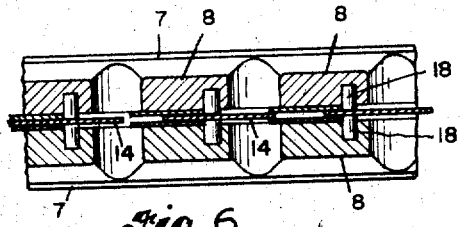
Fig. 6 is a cross sectional view taken along line 6—6 of Fig. 2.

Referring now to the drawings, the device shown in Fig. 1 includes an elongated frame comprising end caps 1 and 2 and an intermediate elongated section 3. Rotatably mounted in end cap 1 is a sprocket wheel 4 over which an endless chain 5 passes in driving engagement. Rotation of sprocket wheel 4 in a counter-clockwise direction, as viewed in Fig. 1, may be effected by any suitable means, not shown. Within end cap 2 is an idler sprocket wheel 6 which also engages chain 5 and which can be adjusted longitudinally so that the chain is fairly taut between the two sprocket wheels 4 and 6. Extending longitudinally of the frame and generally parallel to a straight section of the chain between the sprocket wheels 4 and 6 is a comb 7 including a plurality of teeth 8. In the form of device shown, the teeth 8 are of pyramid shape, although they may be of other shape as desired. Comb 7 is made up of two identical half sections defining cavities therebetween, as clearly shown in Fig. 5. The purposes of these cavities will be described in another paragraph of this description. End caps 1 and 2 and the intermediate section 3 are secured to the comb 7 and the comb half sections to one another by screws 9.

Sprocket wheel 6 is mounted for rotation in a block 10 which is adjustable longitudinally of the frame and comb as by guideways 11 in the comb. One end of an adjusting screw 12 is threadably engaged in comb 7 and bears against block 10 and consequently when screw 12 is turned, the block 10 and sprocket wheel 6 carried thereby will be moved to tighten the chain 5 as desired.

Figure 3:
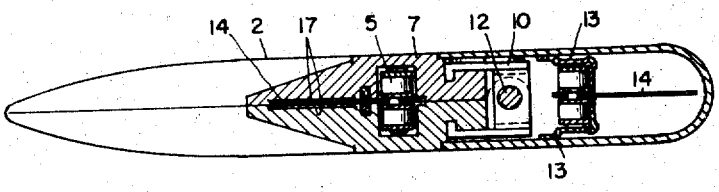
Fig. 3 is a cross sectional view taken along line 3—3 of Fig. 1.
Figure 4:
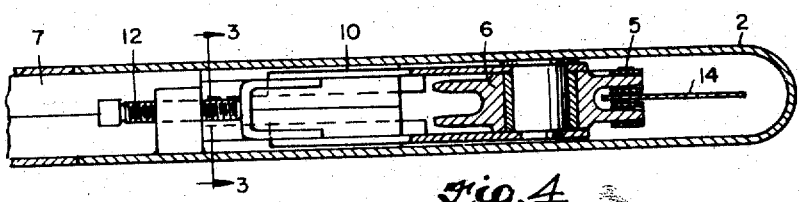
Fig. 4 is a cross sectional view taken along line 4—4 of Fig. 2.

As shown in Figs. 2 and 3, the frame is provided with longitudinally extending guide strips 13 for guiding chain 5 so that it moves in a generally straight line between the sprocket wheels and at least precludes vibration of the chain in one direction so that the knives 14 carried thereby cannot rub against the frame.

Defined between the half sections of the comb is a longitudinally extending cavity 15 in which the other side of the chain 5 is guided for movement in a straight line between the sprocket wheels. Each half section of the comb is also provided with a longitudinal groove in which is a felt or similar sealing strip 16. As will be described, these strips 16 engage opposite sides of the knives 14 to prevent ingress of dirt or other foreign matter into the chain and sprocket mechanism chamber. Each tooth 8 of the comb 7 is provided with a dovetail groove in which a ledger plate 17 is fitted. Each pair of ledger plates 17 associated with each tooth 8 are held by such dovetails in spaced parallel relation, the spacing therebetween being substantially equal to the thickness of the knives 14. Stop pins 18 in each tooth section serve to position each ledger plate 17 in proper relation to the tooth 8 with which it is associated. The ledger plates 17 are preferably stamped from sheet metal and the edges 19 and 20 thereof are left square or transverse of the faces thereof. Edge 19 of each ledger plate 17 preferably projects beyond the edge of tooth 8 a slight amount. Ledger plates 17 can readily be replaced by shifting the same toward the left as viewed in Fig. 2 until the dovetail portion 21 is disengaged from the dovetail groove in tooth 8 and then shifting the same laterally of the comb. These ledger plates 17 can, if desired, be made of strip steel having beveled edges and merely cutting sections from said strip.

Figure 7:
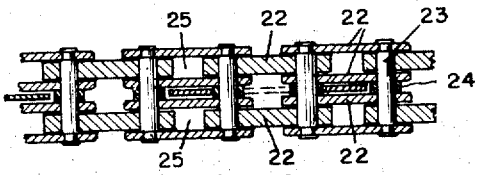
Fig. 7 is a longitudinal cross sectional view of one form of chain.
Figure 8:
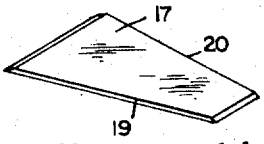
Figs. 8 and 9 are perspective views of the cutting elements.

The chain 5 as used in this device is preferably of the link and pin type wherein adjacent ends of the links are pivotally connected to pins. A typical chain is shown in Fig. 7 and comprises links 22 with pins 23 therethrough and an intermediate spacer sleeve 24 on each pin 23. In the present form, the teeth of the sprocket wheels 4 and 6 project into the spaces 25 between adjacent links and engage such links in driving relation.

Figure 9:
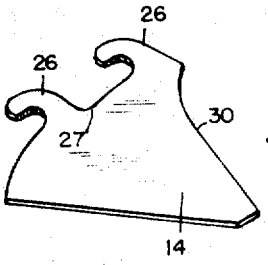
Figure 10:
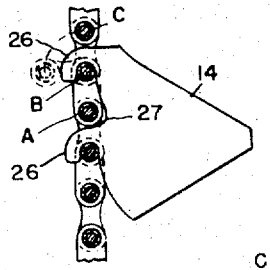
Figs. 10 and 11 are views showing the manner of detaching the knife from the chain.
Figure 11:
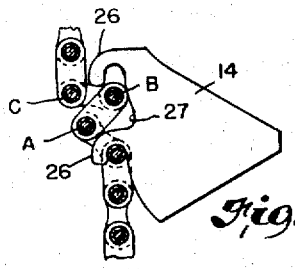

The plurality of knives 14 are detachably connected to the chain 5. As clearly shown in Fig. 9, each knife is of generally triangular shape and includes spaced ear portions 26 which are hook shape. Both of the hook portions extend in the same direction. The inner surface of each ear portion is shaped to partially encircle the first and third pins 23 of three successive pins on the chain. The reason for spacing the ear portions so as to skip one pin will be apparent from a study of Figs. 10 and 11. In attaching a knife 14 to the chain 5, the links of the chain are jackknifed to somewhat the position shown in Fig. 11 and one ear 26 hooked over one of the pins of the chain. Pin A is then shifted to the position shown in Fig. 10 whereupon pin B will engage in the other ear 26. Pin C can then be swung from the dotted position of Fig. 10 to the solid line position of Fig. 10 about pin B as an axis. Ears 26 are of such width that when chain 5 is disposed in a straight line as in Fig. 10, the knife 14 cannot be displaced longitudinally of the chain. The hooks on the ears, of course, prevent lateral displacement of the knife relative to the chain. Knife 14 is provided with a portion 27 opposite pin A to permit limited lateral displacement of pin A out of alignment with the pins engaged by the ears 26 so that the chain can pass around the sprocket wheels 4 and 6. To remove the knife 14 from the chain, the above described steps are simply reversed.

Referring now to Fig. 2, it is to be observed that each knife 14 has portions 28 in abutting relation with adjacent knives 14. These abutting portions 28 bear angular relation to a plane transverse to a straight section of the chain and serve the dual purpose of minimizing transverse loads on the pins of the chain and of providing a more or less continuous surface when the knives are disposed in straight line relation to one another along the comb 7, against which the strips 16 can bear to exclude dirt from getting into contact with the chain and the sprocket wheels. Knives 14 are also preferably stamped from sheet metal and the edges thereof are left square without any subsequent beveling operations. The knives are successively arranged along the chain so that when the chain is disposed in a straight line there are defined by the knives a series of generally V-shaped spaces corresponding to the V-shaped spaces between the teeth 8 of comb 7.

When the sprocket wheel 4 is rotated, the chain and the knives carried thereby will be moved in the direction shown by the arrow in Fig. 1. As the knives move, they successively enter the space 29 between the teeth 8 and the comb half sections and when passing from left to right, as viewed in Fig. 1, will alternately traverse the V-shaped openings defined by the teeth 8 and move into the space 29 defined by the half sections of the comb. As the edges 30 of the knives 14 move into a position between the ledger plates 17, the blades of grass, for example, between the edges 30 and 19 will be sheared. To assure a uniform tension or strain on the chain resulting from the force required to shear the blades of grass, the distance between adjacent edges 30 and the distance between adjacent edges 19 are made slightly different. In one complete cycle each knife edge 30 will have traversed each opening or space between the teeth 8 and will have performed a shearing operation on whatever material was between said edge 30 and the edges 19 of the ledger plates. However, because of the difference in spacing, as above noted, only a certain number of the knives along the comb will be in a shearing position at any one instant. Thus, a certain number of knives are cutting at all times and thus the resultant stress on the chain will remain substantially constant during the entire cycle barring, of course, unusual conditions as where a twig or heavy stem of a weed may be sheared.

To further clarify the operation of this device, the movement of a knife from a position in between the ledger plates of one tooth 8 to the same position in the next succeeding tooth 8 will be described. When knife 14 is in position between the two ledger plates 17 of one of the teeth 8, the V-shaped opening between adjacent knives will be in register with the V-shaped opening between two adjacent teeth 8. In such position of the knife, the blades of grass will project above the top face of the knife 14. As the knife moves, the edge 30 thereof will gradually pass into the space between the ledger plates 17 and the blades of grass at the point where the edge 30 intersects or passes in between the edges 19 of the ledger plates will be sheared. As the knife moves, the point of such intersection moves laterally of the comb 7 and thus when the edge 30 reaches the position where it is completely disposed between the ledger plates 17, all of the blades of grass originally disposed laterally between the edges 30 and 19 will have been sheared. Of course, edges 30 and 19 may be parallel laterally of the comb instead of divergent, as shown. In such former case, all of the blades of grass originally in the opening between the teeth would be sheared simultaneously.

In this device the cutting elements, namely the ledger plates 17 and knives 14 are of simple constructioon and can be stamped from sheet metal without requiring further work to be done and each such element can readily be replaced in case of wear or damage thereto. *As indicated earlier, the edges of these elements, which perform the cutting, are left square or perpendicular to the respective side faces thereof, with the result that wedging of the material being cut therebetween is prevented. This is in contrast to the conventional bevelled cutting edges which have a tendency to wedge or jam the material, particularly in the cutting of tough stemmed plants such as certain straws and weeds.*

Other modes of applying the principle of the invention may be employed, change being made as regards the details described, provided the features stated in any of the following claims or the equivalent of such be employed.

I therefore particularly point out and distinctly claim as my invention:

1. In a shearing device, support means, spaced ledger plates carried thereby, *and* a knife of thickness substantially equal to the space between said plates movable to a position between said plates, [and means preventive of wedging in cutting, including] *said plates and said knife having* cutting edges [on said plates and knives] *which are* perpendicular to the planes of the side faces thereof[.] *to prevent wedging of material being cut therebetween.*

2. In a shearing device, support means including spaced cooperating half sections with cavities between, spaced ledger plates held in said cavities, and having parallel inner faces terminating in cutting edges disposed in a plane transverse to the planes of said faces, *and* a knife of uniform thickness substantially equal to the space between said plates movable to a position between said plates [,] and *having* [means preventive of wedging in cutting, including] cutting edges [on said knife] *which are* perpendicular to the planes of said faces [.] *to prevent wedging of material being cut between said knife and said ledger plates.*

[3. In a shearing device having: a support, a ledger plate carried thereby, a chain movable in said support, and a knife carried by said chain in cutting relation with the ledger plate, means for detachably connecting said knife and chain, said means consisting of hook portions on one to engage the other.]

[4. In a shearing device, support means, a chain comprising a series of links pivotally joined by pins and movably mounted in said support, and a knife detachably connected to said chain provided with spaced ear portions partially encircling alternate pins.]

[5. In a shearing device, support means, a chain comprising a series of links pivotally joined by pins and movably mounted in said support, and a knife detachably connected to said chain provided with spaced ear portions partially encircling alternate pins, the intervening pin being laterally movable to move said alternate pins out of engagement with said ear portions.]

[6. In a shearing device, support means, a chain comprising a series of links pivotally joined by pins and movably mounted in said support, a knife detachably connected to said chain provided with spaced ear portions partially encircling alternate pins, and guide means for said chain to hold adjacent pins in substantially lateral alignment.]

7. In a shearing device, support means, a chain movably mounted therein, a plurality of knives connected to said chain, each knife having an abutting contact with the adjacent knife at the back on a curved line, thereby supporting against cutting thrust.

[8. In a shearing device, support means, a chain movably mounted therein, a plurality of knives connected to said chain provided with edges thereof in abutting relation to one another, and resilient longitudinal sealing means extending along said knives and engageable therewith in a region including said abutting edges.]

9. In a shearing device, support means, a chain comprising a series of links pivotally joined by pins and movably mounted in said support, and a knife connected to said chain by spaced ear portions partially encircling non-adjacent pins, and means for disassembly of the knife with the chain including a contour portion on said knife between said ear portions out of alignment with successive pins whereby on sharply bending the chain the knife ear portions are freed[.] *such spaced ear portions of said knife projecting inwardly beyond the inner edges of said links, said support means being provided with a guide slot into which the inner projections of such ear portions extend.*

10. In a shearing device, support means, an endless chain carried thereby movable by rotation of spaced sprocket wheels engageable with said chain, a plurality of knives connected to said chain and movable therewith, a comb in said support means parallel to a portion of said chain between said sprocket wheels provided with a space between which said knives can move, said comb and said knives each defining a series of openings alternately in and out of alignment as said knives move, [adjacent portions of] *the portions of said comb and said knives adjacent* said openings being provided with *transverse* cutting edges perpendicular to the [direction] *plane* of movement of said knives, and each knife having an abutting contact with the adjacent knife at the back on a curved line.

11. In a shearing device, support means, a comb thereon, spaced ledger plates fixed to said comb, and a knife of thickness substantially equal to the space between said plates movable to a position between said plates, said plates and said knife being provided with *transverse* cutting edges perpendicular to the [direction] *plane* of movement of said knife, said plates and said comb including interengaged dovetail portions for maintaining said plates in fixed spaced relation to one another, and said comb including stop pins engageable with said plates for positioning said plates relative to said comb in a direction parallel to the movement of said knife.

*12. In a device of the character wherein a work-performing member is removably supported by an articulated chain, the combination of a continuous chain comprising a plurality of links each comprising a pair of laterally spaced plates, connecting means for said links comprising a plurality of pins extending transversely of and connecting said links; a work-performing member comprising a body portion, and attaching means for removably securing said body portion to said chain comprising a pair of hook-shaped projections spaced longitudinally with respect to said body portion adapted to be disposed between laterally spaced plates of said chain and, when the points of articulation of said chain are of maximum spacing, respectively partially encircle anchor pins of said chain which are so spaced as to provide at least one point of articulation of said chain between such anchor pins, whereby said hook-shaped projections may be moved out of engagement with said anchor pins only by articulation of said chain about said point of articulation between said anchor pins and movement toward each other of said anchor pins, the terminal portions of said hook-shaped projections being of such width as to extend inwardly beyond the inner periphery of said chain, and a support for said chain having a channel opening into which said terminal portions of said hook-shaped projections extend.*

*13. The combination as set forth in claim 12 characterized further in that said support includes a sprocket wheel having a peripheral slot within which the terminal portions of said hook-shaped projections travel and are guided as said work-performing member is moved about said wheel.*

*14. The combination as set forth in claim 12 characterized further in that said work-performing member is substantially flat and disposed in a plane substantially at right angles to the anchor pins of the chain with which it is engaged.*

*15. The combination as set forth in claim 12 characterized further in that the width of said pair of hook-shaped projections at the approximate longitudinal centerline of said chain is only slightly less than the spacing of the anchor and chain connecting pins between which said projections are respectively disposed.*

*16. The combination as set forth in claim 12 characterized further in that said work-performing member is a cutting device having a cutting edge which extends outwardly of said chain when the member is secured to the latter.*

*17. The combination as set forth in claim 16 characterized further in that said cutting device has arcuate end portions adapted to abut uniformly corresponding end portions of additional devices of identical construction arranged therewith in substantially a straight line.*

*18. In a device of the character wherein a work-performing member is removably supported by an articulated chain for movement therewith, the combination of a chain comprising a series of links pivotally joined by pins; and a work-performing member comprising a body portion, and attaching means for removably securing said body portion to said chain comprising a pair of hook-shaped projections spaced longitudinally with respect to said body portion adapted partially to encircle alternate pins of said chain, said hook-shaped projections both opening to the rear relative to the normal direction of movement of said chain and being of such longitudinal extent as substantially to extend from one to the other of the two chain pins between which they are respectively disposed when said pins are at maximum spacing, thereby to hold said work-performing member against longitudinal movement relative to said chain in substantially straight travel thereof, the body portion of said work-performing member being relieved in the region thereof adjacent the chain pin intermediate the partially encircled pins so that such intermediate pin can move outwardly to permit said chain with said member attached to describe an arc, the reduction in the spacing of such intermediate pin and the rearmost of the partially encircled pins resulting from such outward movement of the former causing the two cooperably to grip and firmly lock the hook-shaped projection disposed therebetween, whereby said chain may travel in a curved path as well without loosening of said work-performing member therein.*

References Cited in the file of this patent or the original patent

UNITED STATES PATENTS

| Number | Name | Date |
|---|---|---|
| 390,510 | Norris | Oct. 2, 1888 |
| 660,281 | Traphagen | Oct. 23, 1900 |
| 744,393 | Palmer | Nov. 17, 1903 |
| 1,050,307 | Spielman | Jan. 14, 1913 |
| 1,430,408 | Shaw | Sept. 26, 1922 |
| 1,458,250 | Staudinger | June 12, 1923 |
| 1,494,308 | Hover | May 13, 1924 |
| 1,532,279 | Ullom | Apr. 7, 1925 |
| 1,667,985 | Purnell | May 1, 1928 |
| 1,839,718 | Wagar | Jan. 5, 1932 |
| 1,974,557 | Andis | Sept. 25, 1934 |

FOREIGN PATENTS

| Number | Country | Date |
|---|---|---|
| 564,772 | France | Jan. 10, 1924 |